(12) United States Patent
Sasaki et al.

(10) Patent No.: US 10,198,632 B2
(45) Date of Patent: Feb. 5, 2019

(54) SURVEY DATA PROCESSING DEVICE, SURVEY DATA PROCESSING METHOD, AND SURVEY DATA PROCESSING PROGRAM

(71) Applicant: TOPCON CORPORATION, Itabashi-ku (JP)

(72) Inventors: Takeshi Sasaki, Itabashi-ku (JP); Tetsuji Anai, Itabashi-ku (JP); Hitoshi Otani, Itabashi-ku (JP); Nobuo Kochi, Itabashi-ku (JP)

(73) Assignee: TOPCON CORPORATION, Tokyo (JP)

( * ) Notice: Subject to any disclaimer, the term of this patent is extended or adjusted under 35 U.S.C. 154(b) by 151 days.

(21) Appl. No.: 15/196,425

(22) Filed: Jun. 29, 2016

(65) Prior Publication Data

US 2017/0004345 A1 Jan. 5, 2017

(30) Foreign Application Priority Data

Jul. 2, 2015 (JP) .................................. 2015-133736

(51) Int. Cl.
*G06K 9/00* (2006.01)
*G06T 7/73* (2017.01)

(52) U.S. Cl.
CPC .............. *G06K 9/0063* (2013.01); *G06T 7/73* (2017.01); *G06T 2207/10028* (2013.01); *G06T 2207/10032* (2013.01)

(58) Field of Classification Search
CPC ........ G06K 9/0063; G06T 2207/10028; G06T 2207/10032; G06T 7/73
See application file for complete search history.

(56) References Cited

FOREIGN PATENT DOCUMENTS

JP 2013-96745 5/2013

OTHER PUBLICATIONS

Frueh, Christian, and Avideh Zakhor. "Constructing 3D city models by merging ground-based and airborne views." Computer Vision and Pattern Recognition, 2003. Proceedings. 2003 IEEE Computer Society Conference on. vol. 2. IEEE, 2003. (Year: 2003).*

* cited by examiner

*Primary Examiner* — Nirav G Patel
(74) *Attorney, Agent, or Firm* — Xsensus LLP

(57) ABSTRACT

The efficiency of the work for identifying reference points that are included in photographed images is improved. Targets are located and are photographed from short distances, and the positions of the targets are measured. A 3D reference point model is generated by using the measured positions of the targets as apexes. Then, the positions of the targets that are detected from images taken by a UAV from the air are calculated from a three-dimensional model that are generated by the principle of the stereoscopic three-dimensional measurement, whereby a 3D relative model constituted of a TIN is obtained. After a matching relationship between the 3D reference point model and the 3D relative model is identified, the positions of the targets in the 3D relative model are estimated based on the identified matching relationship, and the positions of the reference points in the images taken from the UAV are estimated.

7 Claims, 10 Drawing Sheets

● : Reference point   ○ : Gravity center position

SURVEY DATA PROCESSING DEVICE, SURVEY DATA PROCESSING METHOD, AND SURVEY DATA PROCESSING PROGRAM

BACKGROUND OF THE INVENTION

Technical Field

The present invention relates to a surveying technique.

Background Art

A technique for obtaining a three-dimensional model of the topography of an object based on image data (three-dimensional topographic data in which the topography of the object is modeled as electronic data) is publicly known (for example, refer to Japanese Unexamined Patent Application Laid-Open No. 2013-096745). The image data may be obtained by photographing a civil engineering worksite or the like from the air, for example. In this technique, work is required to add actual dimensions to the obtained three-dimensional model. In this work, reference points included in each of several tens of, to several hundreds of, or even more, still images need to be found and be matched with others among the still images.

A technique for automatically detecting the reference points by software processing has also been researched. In this technique, a step of attaching a target, which records readable positional information, on a reference point is performed so as to easily detect the reference point by software processing. However, the photographed areas in the images that were photographed from the air are vast, and therefore, the processing for automatically detecting the targets from the images and further reading the positional information takes time, and the targets tend not to be detected or to be mistakenly detected. Therefore, in actual practice, an operator needs to visually monitor the still images by manually expanding or reducing each of the still images one by one and identify the positions of targets in the still images. This working procedure should be performed on each of several tens of, to several hundreds of, or more, still images, and this is thereby complicated and inefficient.

SUMMARY OF THE INVENTION

In view of these circumstances, it is an object of the present invention to provide a technique for improving efficiency of the work for identifying reference points that are included in photographed images.

A first aspect of the present invention provides a survey data processing device including a data receiving unit, a first shape model generating unit, a reference point detecting unit, a second shape model generating unit, a first matching relationship identifying unit, and a reference point position obtaining unit. The data receiving unit receives first data and second data. The first data contains data of first images, which are obtained by photographing each of multiple reference points that are located on the ground surface, and also contains data of three-dimensional positions of the multiple reference points. The second data contains data of second images, which are obtained by photographing an area that includes the multiple reference points from a mobile vehicle. The first shape model generating unit generates a first shape model that has an apex at each of the three-dimensional positions of the multiple reference points, which are contained in the first data. The reference point detecting unit detects images of the reference points from the second images. The second shape model generating unit generates a second shape model that has an apex at each of the reference points detected from the second images. The first matching relationship identifying unit identifies a first matching relationship between the first shape model and the second shape model. The reference point position obtaining unit obtains three-dimensional positions of the reference points in the second images based on the first matching relationship.

According to the first aspect of the present invention, by identifying the matching relationship of the two shape models, the positions of the reference points that are known in the first shape model are identified in the second shape model, and then the positions of the reference points in the second images, which are bases of the second shape model, are identified.

According to a second aspect of the present invention, in the invention according to the first aspect of the present invention, the second shape model may be a three-dimensional model that is generated based on the second images, which are obtained from different viewpoints, by an intersection method.

According to a third aspect of the present invention, in the invention according to the first or the second aspect of the present invention, the survey data processing device may further include a second matching relationship identifying unit and a three-dimensional position identifying unit. The second matching relationship identifying unit identifies a second matching relationship between one of the first images and a second image, which is selected among the second images and corresponds to the first image, based on the three-dimensional positions of the reference points that are obtained by the reference point position obtaining unit. The three-dimensional position identifying unit identifies a three-dimensional position of the reference point in the selected second image based on the second matching relationship. According to the third aspect of the present invention, matching of the images is finally performed, and the reference point in the second image is identified. By matching the images with each other, the work for detecting the reference point from the second image is performed with high precision.

According to a fourth aspect of the present invention, in the invention according to the third aspect of the present invention, the second images may be wide area images that are photographed from an aircraft, the first images may be taken by photographing the reference points from short distances, and the second matching relationship identifying unit may identify a matching relationship between the one first image and an enlarged image of a part of the selected second image, which is enlarged based on the identified position of the reference point. According to the fourth aspect of the present invention, the first images are enlarged images that are taken from relatively short distances compared with the second images, and therefore, the reference points are clearly photographed therein. Accordingly, by comparing the clear first image with the second image, in which the identified position of the reference point is enlarged, the matching relationship of the first image and the second image is reliably obtained with high precision.

According to a fifth aspect of the present invention, in the invention according to the fourth aspect of the present invention, the three-dimensional position of the reference point that is photographed in the one first image may be identified in the selected second image after the matching relationship between the one first image and the enlarged image is identified. The locational positions of the reference points that are photographed in the first images are measured by a method using a GNSS or the like. Therefore, the positions of the reference points in the first images are obtained with high precision. On the other hand, there may be cases in which the reference points are not detected or not all of the reference points are detected from the second images (this is a basic problem in the conventional techniques). According to the fifth aspect of the present invention, the positional information of the reference point that is photographed in the first image is obtained in the second image after the matching relationship of the first image and the second image is identified. Therefore, the reference points may not necessarily be detected from the second image, and there is no need to detect all of the reference points from the second image.

According to a sixth aspect of the present invention, in the invention according to the fourth or the fifth aspect of the present invention, the matching relationship between the one first image and the enlarged image may be identified by using image information other than the images of the reference points. The identification of the matching relationship between the first image and the second image, in which the identified position of the reference point is enlarged, is processing of matching features between the images, and therefore, image information other than the reference points is also used. Accordingly, there are various kinds of elements for identifying the matching relationship, whereby high matching precision is obtained.

According to a seventh aspect of the present invention, in the invention according to any one of the third to the sixth aspects of the present invention, the first data may contain data of three-dimensional positions of the reference points that are not detected from the second images, and the three-dimensional positions of the reference points that are not detected from the second images may be identified by the three-dimensional position identifying unit. In the invention according to any one of the third to the sixth aspects of the present invention, the one first image and the selected second image are matched with each other by using image information other than the reference points. Therefore, even when the reference points cannot be detected from the second images, the reference points are identified in the second images. According to this technique, the burden that is required to detect the reference points from the second images is reduced.

In general, in order to reduce detection failure of the reference points from the second images that are wide area images, a technique of subdividing a grid (section of a divided image) to be image analyzed may be performed. However, in such a case, disadvantages, such as increase in operation failures due to increase in the load on a CPU (the operation is not completed and has failed) and prolonging of the processing time, tend to be predominant over the advantages such that the detection precision is improved. In view of this, normally, the reference points are identified in the images taken from a mobile vehicle, by confirmation work that is still visually performed by an operator in actual practice.

According to the seventh aspect of the present invention, even when the images of the reference points are difficult to detect from the second images for some reason, for example, when mud covers a target that is arranged at a reference point, the first image and the second image are matched with each other by matching images other than the reference points, whereby the reference points in the second images are identified. At this time, the area to be searched for the matching is specified and is limited, and therefore, increase of the burden on the CPU is avoided.

According to an eighth aspect of the present invention, in the invention according to any one of the first to the seventh aspects of the present invention, the first shape model may be a first three-dimensional TIN model, and the second shape model may be a second three-dimensional TIN model. The first three-dimensional TIN model has apexes at the three-dimensional positions of the multiple reference points, which are contained in the first data. The second three-dimensional TIN model is generated by matching the positions of the reference points in the second images with a three-dimensional model that is generated by an intersection method based on the multiple second images, which are obtained from different viewpoints.

According to a ninth aspect of the present invention, in the invention according to the eighth aspect of the present invention, the first matching relationship identifying unit may identify the first matching relationship between the first shape model and the second shape model based on similarity between triangles for constituting the first three-dimensional TIN model and triangles for constituting the second three-dimensional TIN model.

A tenth aspect of the present invention provides a survey data processing method including receiving first data and second data, generating a first shape model, detecting images of reference points from second images, generating a second shape model, identifying a first matching relationship between the first shape model and the second shape model, and obtaining three-dimensional positions of the reference points in the second images based on the first matching relationship. The first data contains data of first images, which are obtained by photographing each of multiple reference points that are located on the ground surface, and also contains data of three-dimensional positions of the multiple reference points. The second data contains data of second images, which are obtained by photographing an area that includes the multiple reference points from a mobile vehicle. The first shape model has an apex at each of the three-dimensional positions of the multiple reference points, which are contained in the first data. The second shape model has an apex at each of the reference points that are detected from the second images.

An eleventh aspect of the present invention provides a computer program product including a non-transitory computer-readable medium storing computer-executable program codes for processing survey data. The computer-executable program codes include program code instructions for receiving first data and second data, generating a first shape model, detecting images of reference points from second images, generating a second shape model, identifying a first matching relationship between the first shape model and the second shape model, and obtaining three-dimensional positions of the reference points in the second images based on the first matching relationship. The first data contains data of first images, which are obtained by photographing each of multiple reference points that are located on the ground surface, and also contains data of three-dimensional positions of the multiple reference points. The second data contains data of second images, which are obtained by photographing an area that includes the multiple reference points from a mobile vehicle. The first shape model has an apex at each of the three-dimensional positions of the multiple reference points, which are contained in the first data. The second shape model has an apex at each of the reference points that are detected from the second images.

According to the present invention, a technique for improving efficiency of the work for identifying the reference points that are included in the photographed images is obtained.

PREFERRED EMBODIMENTS OF THE INVENTION

1. First Embodiment

Outline

In this embodiment, a three-dimensional model of the topography of an object (three-dimensional topographic data in which the topography of the object is modeled as electronic data) is generated based on image data. The image data is obtained by photographing a civil engineering worksite or the like from the air.

Figure 1:
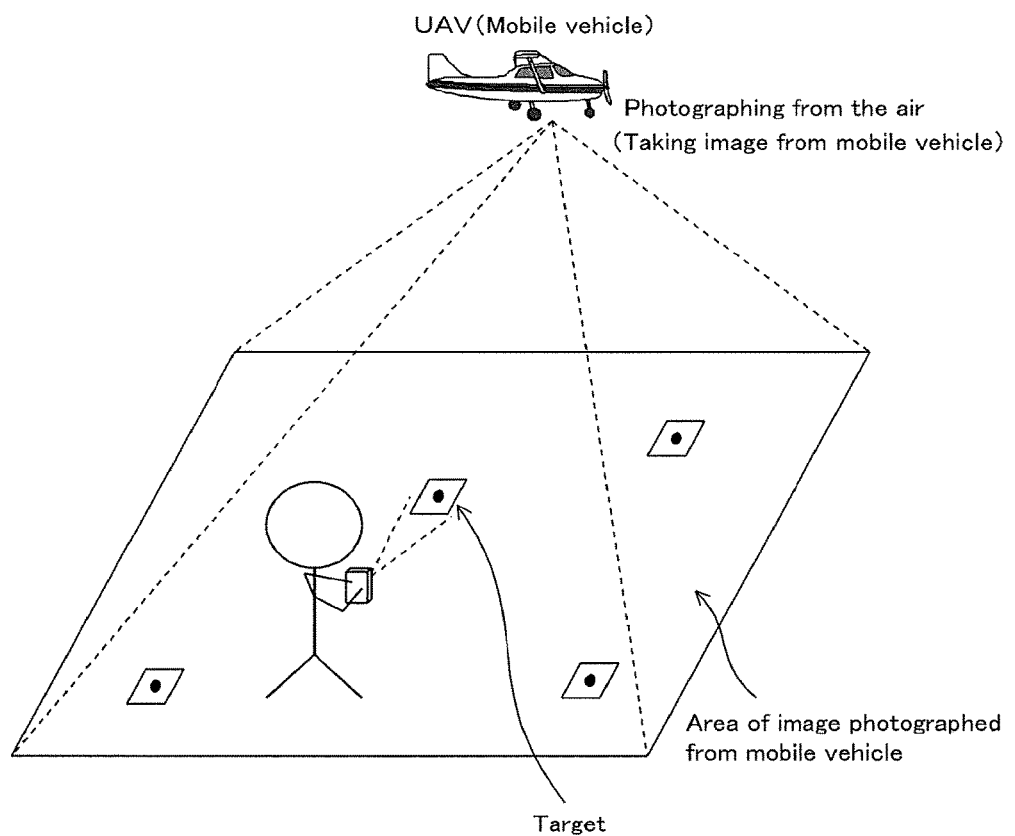
FIG. 1 is a conceptual diagram showing a survey state.

The outline of this embodiment will be described with reference to FIG. 1. FIG. 1 shows a state in which a UAV (Unmanned Air Vehicle) photographs a ground surface, on which multiple targets are located, from the air. Here, an autonomously flying unmanned air vehicle is exemplified, but any mobile vehicle that flies by any other flight principle may be used. The UAV may be used by remote control. Alternatively, a manned aircraft may also be used instead of the UAV.

A dedicated target is located at each of multiple locations on the ground surface to be surveyed so as to function as reference points. Each of the multiple targets is photographed as a ground surface image by an operator, and the location of each of the multiple targets is measured in advance. The location of the target is measured by a TS (total station), a surveying device having a high precision GNSS (Global Navigation Satellite System), a GNSS function equipped in a smart phone, or a GNSS function equipped in each of other various kinds of electronic devices.

The UAV photographs the ground surface at a predetermined time interval while flying, whereby images taken from the mobile vehicle (still images that are photographed from the UAV) are obtained. The interval of taking the images from a mobile vehicle may be 2 seconds, for example, but other time intervals such as 0.5 seconds, 1 second, or 3 seconds, may also be adopted. Alternatively, a moving image may be photographed, and frame images constituting the moving image (for example, a moving image may be constituted of 30 frame images per second) may be extracted at a predetermined interval and may be used as the images taken from the mobile vehicle.

In this embodiment, a matching relationship between the ground surface image and the image taken from the mobile vehicle is calculated by comparing three-dimensional TIN models with each other. Then, the positions, which are measured in advance and are known, of the targets that are photographed in the ground surface images are identified (estimated) in the image taken from the mobile vehicle. Next, a search area is set in the image taken from the mobile vehicle, based on the identified values. A matching relationship between the ground surface image and the search area image is calculated, whereby the positions of targets in the image taken from the mobile vehicle are calculated with further high precision. By identifying the positions of the targets in the image taken from the mobile vehicle, a matching relationship between the multiple images taken from the mobile vehicle is determined, and actual dimensions are added to the images taken from the mobile vehicle. Thus, actual dimensions are added to a three-dimensional model of the object to be surveyed, which is obtained from the images taken from the mobile vehicle.

Hardware Composition

Figure 11:
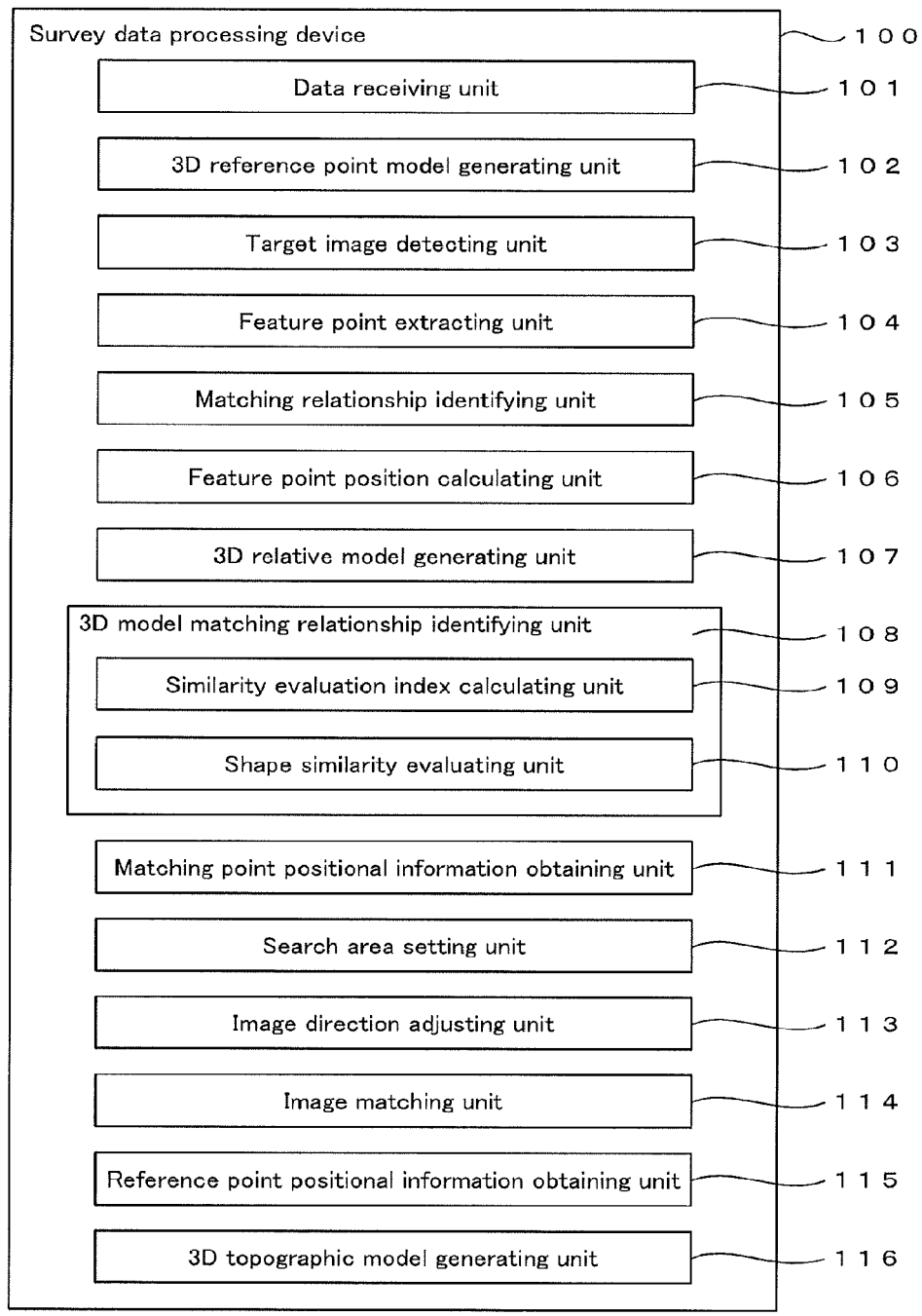
FIG. 11 is a block diagram of a survey data processing device of an embodiment.

FIG. 11 shows a block diagram of a survey data processing device 100 of an embodiment. The survey data processing device 100 is a computer that includes a CPU, a storage unit composed of an electronic memory and a hard disk unit, various kinds of interface circuits, and other arithmetic circuits as necessary. The survey data processing device 100 has functional units as described below. A portion or multiple of the functional units may be constructed by software or by dedicated hardware. For example, each of the functional units shown in FIG. 11 is composed of electronic circuits such as a CPU (Central Processing Unit), an ASIC (Application Specific Integrated Circuit), and a PLD (Programmable Logic Device) such as an FPGA (Field Programmable Gate Array). In addition, a part or the entirety of the survey data processing device 100 may be composed by using a commercially available computer that has sufficient operating speed and sufficient storage capacity.

Hereinafter, the survey data processing device 100 will be described. The survey data processing device 100 includes a data receiving unit 101, a 3D reference point model generating unit 102, a image of the target detecting unit 103, a feature point extracting unit 104, a matching relationship identifying unit 105, a feature point position calculating unit 106, a 3D relative model generating unit 107, a 3D model matching relationship identifying unit 108, a matching point positional information obtaining unit 111, a search area setting unit 112, an image direction adjusting unit 113, an image matching unit 114, a reference point positional information obtaining unit 115, and a 3D topographic model generating unit 116. Here, the 3D model matching relationship identifying unit 108 includes a similarity evaluation index calculating unit 109 and a shape similarity evaluating unit 110.

The data receiving unit 101 receives data from the flight log of the UAV, data of images (ground surface images) of each target that are obtained by photographing on the ground surface, and data of the three-dimensional position of each target, which is linked with the ground surface images. Here, the flight log includes data of multiple images taken from the mobile vehicle, data of photographing time of each of the multiple images taken from the mobile vehicle, and data of three-dimensional position and attitude of the UAV (camera) at each photographing time.

The 3D reference point model generating unit 102 generates a 3D reference point model that is constructed of a three-dimensional TIN model, based on data of positions of the targets that are photographed in the ground surface images. The 3D reference point model generating unit 102 performs the processing in step S104 shown in FIG. 2. The image of the target detecting unit 103 detects images of the targets from the images taken from the mobile vehicle. The image of the target detecting unit 103 performs the processing in step S203 shown in FIG. 4.

The feature point extracting unit 104 extracts feature points from the images taken from the mobile vehicle. As the feature points, points that can be differentiated from surroundings, for example, edge portions and portions having colors that are different from surroundings, are extracted. The feature points are extracted by software processing using a differential filter such as a Sobel filter, a Laplacian filter, a Prewitt filter, a Roberts filter, or the like. The feature point extracting unit 104 performs the processing in step S204 shown in FIG. 4. The feature point extracting unit 104 also extracts feature points from a image of the target in image matching processing in step S403 shown in FIG. 6.

Figure 7:
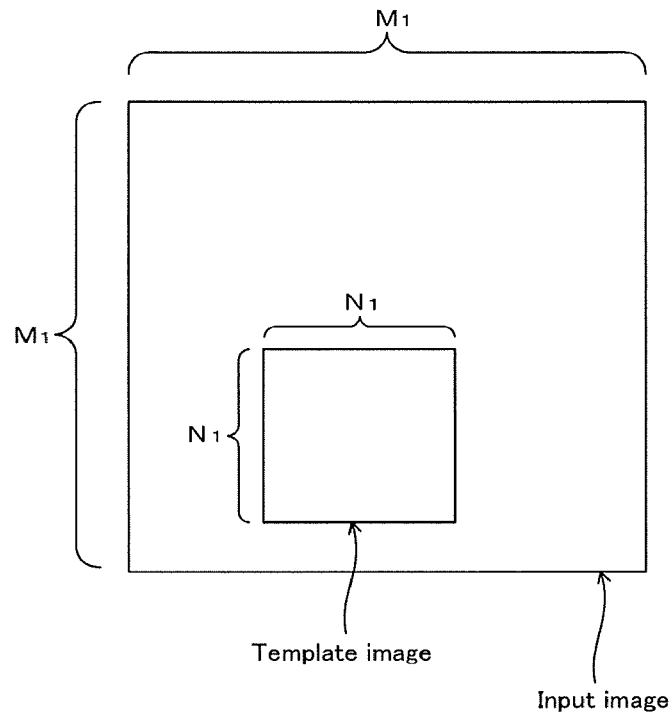
FIG. 7 is an explanatory diagram for template matching.

The matching point identifying unit 105 identifies a matching relationship between the feature points that are respectively extracted from two images taken from the mobile vehicle. That is, the feature points that are extracted from one image taken from the mobile vehicle are matched with the feature points in the other image taken from the mobile vehicle. The processing of this step for identifying the matching relationship between the feature points is performed by template matching as shown in FIG. 7, for example. The matching relationship may be identified by another publicly known method. The matching point identifying unit 105 performs the processing in step S205 shown in FIG. 4. The feature point position calculating unit 106 calculates three-dimensional coordinates of the feature points, of which matching relationships between different still images are identified, by a forward intersection method. The three-dimensional positions of the feature points in the image taken from the mobile vehicle are relative positions when the reference point is still not identified.

The 3D relative model generating unit 107 generates a 3D relative model based on image coordinate values of the targets that are detected from the images taken from the mobile vehicle and based on the three-dimensional positions of the feature points that are obtained from the images taken from the mobile vehicle. The 3D relative model generating unit 107 performs the processing in step S208 shown in FIG. 4.

The 3D relative model is generated as described below. First, a feature point, which coincides with or is closest to the image position of the target that is detected from the image taken from the mobile vehicle, by the image of the target detecting unit 103, is searched among the feature points that are identified by the matching point identifying unit 105. Next, the three-dimensional position of the found feature point is obtained from the calculation result of the feature point position calculating unit 106 and is used as the position of the corresponding target. The processing of this step is performed on all targets that are detected by the image of the target detecting unit 103. In the processing of this step, if the corresponding target is extracted as a feature point, since the three-dimensional position of the corresponding target is already calculated by the feature point position calculating unit 106, this calculated result is used. Thus, the three-dimensional position (relative three-dimensional position) of each of the targets that are detected by the image of the target detecting unit 103 is calculated, and a three-dimensional TIN model is obtained as a 3D relative model having an apex at the three-dimensional position of each of the targets.

The 3D model matching relationship identifying unit 108 identifies a matching relationship between the 3D reference point model and the 3D relative model. The 3D model matching relationship identifying unit 108 performs the processing relating to the flow chart shown in FIG. 5. The similarity evaluation index calculating unit 109 calculates similarity evaluation indexes that are parameters for quantitatively evaluating the similarity of the shapes of the figures. The figures are used for identifying the matching relationship between the 3D reference point model and the 3D relative model. The shape similarity evaluating unit 110 evaluates the similarity between a triangle of TIN constituting the 3D reference point model and a triangle of TIN constituting the 3D relative model, based on the similarity evaluation indexes. The matching relationship between the 3D reference point model and the 3D relative model, which is identified by the 3D model matching relationship identifying unit 108, may be identified by a method that is described in the other embodiment, other than the above method using the TIN models.

The matching point positional information obtaining unit 111 obtains three-dimensional positional information of points that constitute the 3D relative model, based on the information of the matching points, of which matching relationships are identified, between the 3D reference point model and the 3D relative model. That is, the position (position in a specific coordinate system such as a map coordinate system measured by a TS; absolute position) of each of the points constituting the 3D reference point model is known. Therefore, by identifying the matching relationship between the 3D reference point model and the 3D relative model, the three-dimensional positional (absolute position) information of the points for constituting the 3D relative model is obtained. The matching point positional information obtaining unit 111 performs the processing in step S312 shown in FIG. 5.

The search area setting unit 112 sets a search area for searching a reference point (target) in the image taken from the mobile vehicle, based on the positional information of the points that constitute the 3D reference point model. The image direction adjusting unit 113 aligns the direction of the ground surface image with the direction of the search area image that is set in the image taken from the mobile vehicle. By aligning the directions of the images, the precision of the processing that is performed by the image matching unit 114 (described below) is increased. The image direction adjusting unit 113 performs the processing in step S402 shown in FIG. 6.

The image matching unit 114 identifies a matching relationship between the ground surface image and the search area image (enlarged image) that is set in the image taken from the mobile vehicle. The method of the processing of this step is the same as in the processing that is performed by the matching relationship identifying unit 105. The image matching unit 114 performs the processing in step S403 shown in FIG. 6. The reference point positional information obtaining unit 115 identifies the positions of the targets (reference points) in the image taken from the mobile vehicle, based on the matching relationship between the ground surface image and the search area image that is set in the image taken from the mobile vehicle. According to the processing of this step, the positions of the targets in the image taken from the mobile vehicle are identified. The reference point positional information obtaining unit 115 performs the processing in step S404 shown in FIG. 6.

The 3D topographic model generating unit 116 generates a 3D topographic model based on the feature points, which are extracted by the feature point extracting unit 104, and of which three-dimensional positions are calculated by the feature point position calculating unit 106. For example, a 3D topographic model of a civil engineering worksite is generated based on aerial photographs that are taken from a UAV. Regarding the technique for generating a 3D topographic model, for example, a technique disclosed in Japanese Unexamined Patent Application Laid-Open No. 2014-035702 or 2012-230594 may be utilized. Japanese Unexamined Patent Application Laid-Open No. 2014-035702 discloses a technique for generating a three-dimensional model based on three-dimensional point cloud position data that is extracted from two stereoscopic images obtained from different viewpoints. Japanese Unexamined Patent Application Laid-Open No. 2012-230594 discloses a technique for generating a three-dimensional model from three-dimensional point cloud position data that is obtained by a laser scanner. By identifying the three-dimensional positions of the targets in the image taken from the mobile vehicle, the 3D topographic model that is generated by the 3D topographic model generating unit 116 is added with a scale (actual dimensions).

3D Reference Point Model Generating Procedure

Figure 2:
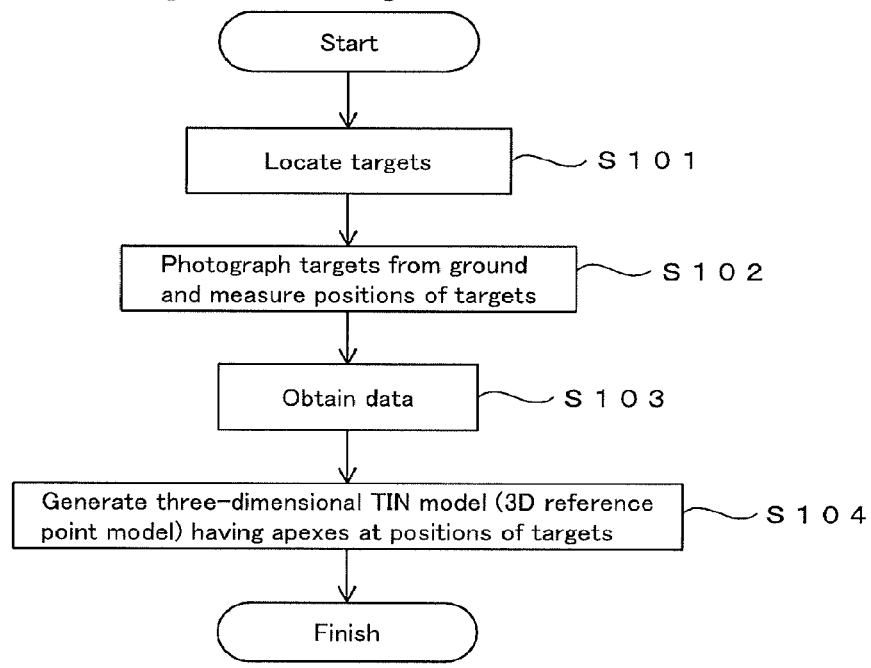
FIG. 2 is a flow chart showing an example of a processing procedure.

FIG. 2 shows an example of a processing procedure that is performed on the ground side. Here, a case of generating a three-dimensional model of a civil engineering worksite will be described. Programs for executing the processing in step S104 shown in FIG. 2 are stored in an appropriate storage medium or a storage region and are executed by hardware shown in FIG. 11.

Figure 3:
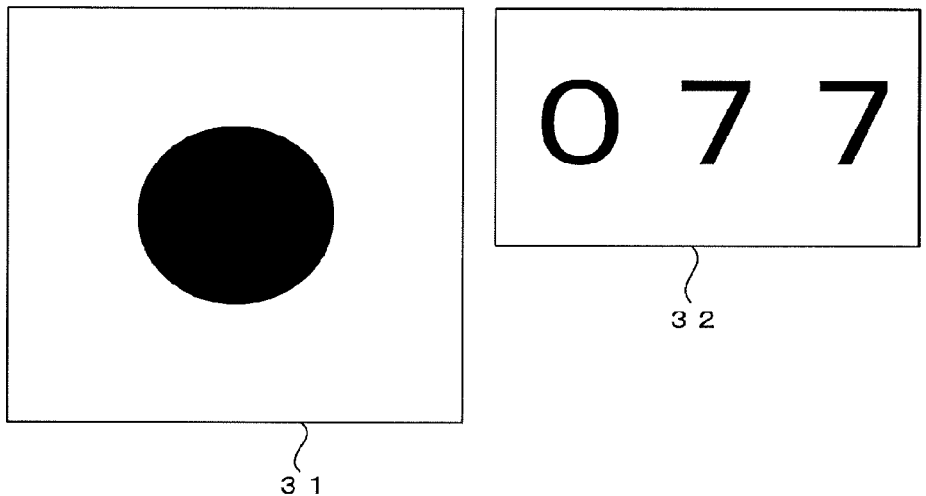
FIG. 3 is an example of a target.

When the processing is started, targets are located in an area to be surveyed (step S101). FIG. 3 shows a target 31 as an example of a target to be used. The target 31 has a structure having a black circle in a white square so as to be easily recognized as an image. The center position of the black circle is recognized as the position of a reference point in an image. The position is surveyed by using the center of the black circle as a reference.

The reference numeral 32 denotes an identification plate that shows an identification number for identifying the target 31 from other targets. The identification plate 32 is arranged near the target 31. Although the identification plate 32 shows an identification number 077 in FIG. 3, the identification number differs in each of multiple targets 31. The target 31 and the identification plate 32 may be integrally formed. Regarding the target, for example, a material disclosed in Japanese Patent No. 4828195 may be used.

After the targets are located (step S101), each of the targets is photographed on the ground, and images (ground surface image) of the targets that are taken on the ground are obtained (step S102). At this time, a view angle (photographing area) is set so that an area of approximately 10 meters by 10 meters will be photographed in a ground surface image, and moreover, photographing is performed so as to include the target 31 as near to the center of the photographing visual field as possible. The target is photographed from a short distance so that the target 31 and the identification plate 32 exemplified in FIG. 3 will be clearly photographed. A photographing device is not specifically limited, and a camera mounted on a TS (Total Station), a camera built in a smart phone, a digital camera, or the like, may be used. Considering convenience and ease of use, a camera built in a smart phone or a digital camera is suitably used.

Moreover, three-dimensional positions of the photographed targets are measured (step S102). The positions of the targets may be measured by a TS or a high precision GNSS unit or by using a positioning technique using a GNSS function of a smart phone or the like.

There are the following two methods for measuring the positions of the targets.
(1) The positions of all of the targets are measured by at least one of a TS and a high precision GNSS unit.
(2) The positions of some of the targets are measured by at least one of a TS and a high precision GNSS unit, and the positions of the other targets are measured by using a GNSS function of a smart phone or the like.

The method (1) is preferable from the view point of obtaining high precision, but the method (2) may be used from the view point of the cost and the working labor. In order to finally obtain a three-dimensional model at high precision, at least four reference points (targets) must be measured with high precision in each of two images, which are taken from the mobile vehicle and constitute a stereoscopic image. Therefore, the positions of the targets are measured by at least one of a TS and a high precision GNSS unit accordingly. Naturally, a positioning method, by which the positions are measured with high precision, can be used instead of the method using at least one of a TS and a high precision GNSS unit. After the positions and the images of the multiple located targets are obtained, these data are stored in an appropriate storage medium. Here, image data of the targets and the identification plates, the identification numbers of the targets, and the positional information of the targets (reference points) are linked with each other and are stored.

After the position data and the image data of the targets are obtained, these data are received by the data receiving unit 101 and are input in the survey data processing device 100 (step S103). After these data are input, a three-dimensional TIN model having apexes at the positions of the targets is generated by the survey data processing device 100 (step S104). A "TIN" is a triangulated irregular network and is a model of an object that is represented by irregular triangles. In the processing of this step, the three-dimensional positional information of the targets, which is obtained in step S102, is plotted in a virtual three-dimensional space, and a triangulated irregular network having apexes at the plotted positions is formed, whereby a three-dimensional TIN model is obtained. Hereinafter, the three-dimensional TIN model that is obtained in step S104 is called a 3D reference point model. After the 3D reference point model is obtained, the processing shown in FIG. 2 is terminated.

3D Relative Model Generating Procedure

Figure 4:
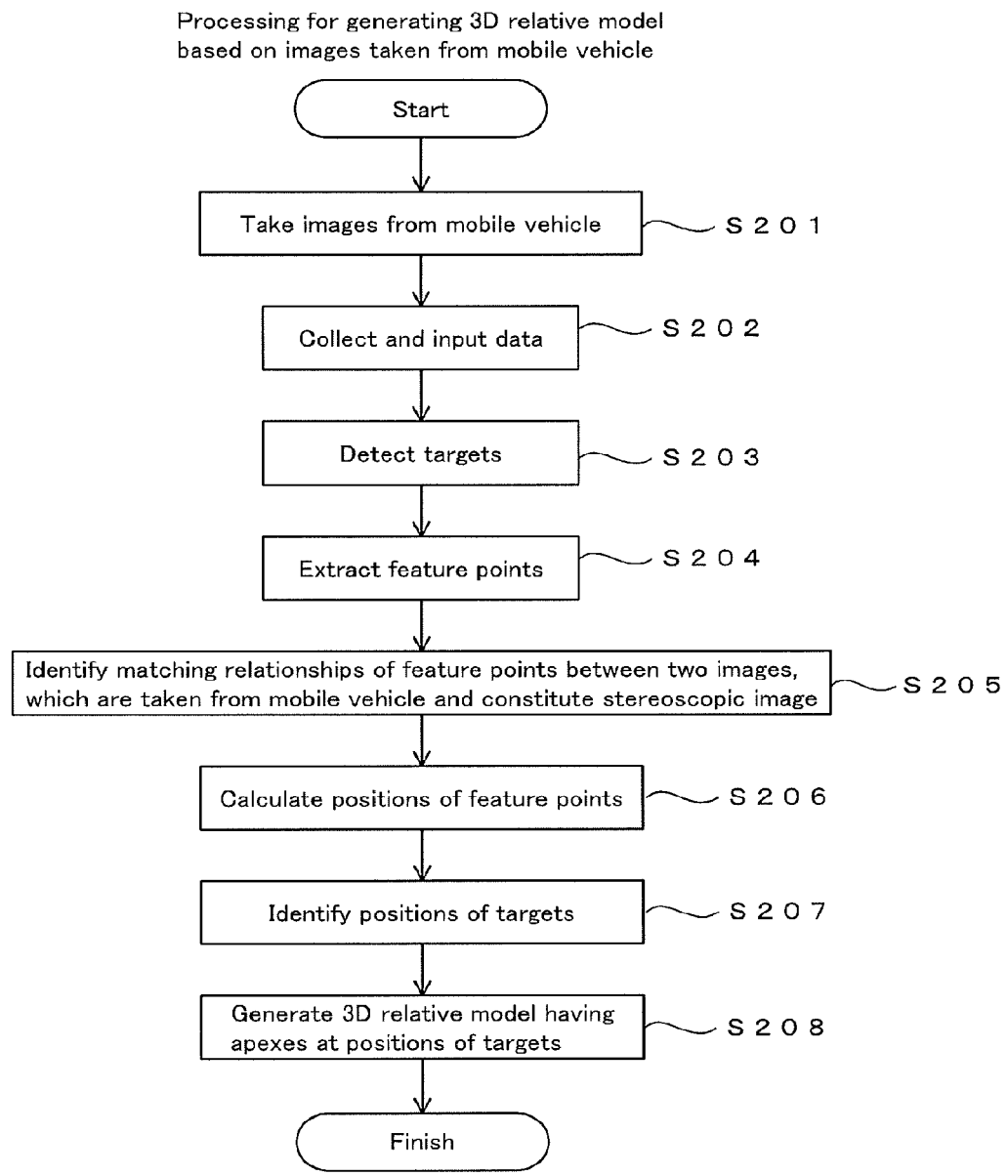
FIG. 4 is a flow chart showing an example of a processing procedure.

Hereinafter, an example of processing for obtaining a 3D relative model, which is to be compared with the 3D reference point model obtained in the processing shown in FIG. 2, will be described. FIG. 4 shows an example of a processing procedure for obtaining a 3D relative model. Programs for executing the processing in step S203 to step S208 shown in FIG. 4 are stored in an appropriate storage medium or a storage region and are executed by hardware shown in FIG. 11.

After the targets are located in the area to be surveyed, the area to be surveyed is photographed by a UAV from the air (step S201). The UAV is equipped with a self-position measuring unit using a GNSS, an IMU (Inertial Navigation Unit), and a camera, and the UAV photographs the ground surface at a predetermined time interval (for example, every 1 second to every 3 seconds) while autonomously flying in a predetermined flight route. The images of the ground surface, which are taken by the UAV, are called images taken from the mobile vehicle. The data of the obtained images taken from the mobile vehicle is linked with the photographing time and the data of position and attitude of the UAV (that is, position and attitude of the camera) at each photographing time, and the data is stored in a flight log. The flight log is stored in a storage medium such as an HDD or a solid-state electronic device in the UAV. The flight log is collected after the flight is completed and is input from the data receiving unit 101 in the survey data processing device 100 (step S202). After step S202, the survey data processing device 100 executes the processing in step S203 and in the subsequent steps.

After the data of the images taken from the mobile vehicle is obtained from the flight log, the image of the target is detected from each of the multiple images taken from the mobile vehicle (step S203). The processing of this step is performed by image analyzing processing by software. At this stage, it is not necessary to detect all of the targets, and it is sufficient to detect only images of the targets that are photographed in easily detectable conditions. Therefore, failure to detect and incomplete detection (such as partial detection) of the targets are allowable in this step of the processing. In addition, although it depends on degree, misdetection of the targets may also be allowable.

Next, feature points are extracted from each of the images taken from the mobile vehicle (step S204). After the feature points are extracted from each of the images taken from the mobile vehicle, matching relationships of the feature points are identified between two images, which are taken from the mobile vehicle and are adjacent on the time axis, that is, two images, which are taken from the mobile vehicle and constitute a stereoscopic image (step S205). Here, images, which are taken from the mobile vehicle from different viewpoints and contain the same object, are selected as the two images taken from the mobile vehicle for constituting the stereoscopic image.

The matching relationships of the feature points are identified by template matching. As the template matching, a sequential similarity detection algorithm (SSDA) method, a cross-correlation coefficient method, or the like may be used. An example of the template matching will be described below. The template matching is a method in which coordinate data of images in two coordinate systems are compared with each other and a matching relationship between the two images is calculated by correlation relationship between the coordinate data. In the template matching, the matching relationship between feature points of two images seen from different viewpoints is calculated. FIG. 7 is an explanatory diagram for explaining the principle of the template matching. In this method, as shown in FIG. 7, a template image of $N_1 \times N_1$ pixels is moved on a searching range $(M_1-N_1+1)^2$ within an input image of $M_1 \times M_1$ pixels which is larger than the template image, and an upper left position of the template image is calculated so that the cross-correlation function $C(a, b)$ denoted by the following First Formula represents the maximum value (that is, the correlation degree becomes maximum).

First Formula $$C(a, b) = \sum_{m_1=0}^{N_1-1} \sum_{n_1=0}^{N_1-1} \frac{\{I_{(a,b)}(m_1, n_1) - \overline{I}\}\{T(m_1, n_1) - \overline{T}\}}{\sqrt{I_{\sigma ab} T_\sigma}}$$

Here, $$\overline{I} = \frac{1}{N_1^2} \sum_{m_1=0}^{N_1-1} \sum_{n_1=0}^{N_1-1} I_{(a,b)}(m_1, n_1)$$

$$\overline{T} = \frac{1}{N_1^2} \sum_{m_1=0}^{N_1-1} \sum_{n_1=0}^{N_1-1} T(m_1, n_1)$$

$$I_{\sigma ab} \frac{1}{N_1^2} \sum_{m_1=0}^{N_1-1} \sum_{n_1=0}^{N_1-1} \{I_{(a,b)}(m_1, n_1) - \overline{I}\}^2$$

$$T_\sigma \frac{1}{N_1^2} \sum_{m_1=0}^{N_1-1} \sum_{n_1=0}^{N_1-1} \{T(m_1, n_1) - \overline{T}\}^2$$

$I_{(a,b)}(m_1, n_1)$: Local image of input image $T(m_1, n_1)$: Template image

The above calculation is performed by changing the magnification of the one image and rotating the one image. In a condition in which the correlation degree is the maximum, the matched region of both images is calculated, and feature points in this region are extracted, whereby matching points are detected.

By using the template matching, a portion that matches between two compared images can be identified, and the matching relationship between the two images can be calculated. In this method, the relative positional relationship between the two images is calculated so that the degree of the correlation relationship between the two images is the maximum. The correlation relationship between the two images is calculated based on the feature points of the two images. Regarding the technique for obtaining the matching relationship between two images, for example, a technique disclosed in Japanese Unexamined Patent Application Laid-Open No. 2013-178656 or 2014-035702 may be used. Japanese Unexamined Patent Applications Laid-Open Nos. 2013-178656 and 2014-035702 disclose a technique relating to extraction of feature points and a technique for calculating three-dimensional positions of feature points. These techniques can be utilized in the technique described in the specification of the present application.

Figure 8:
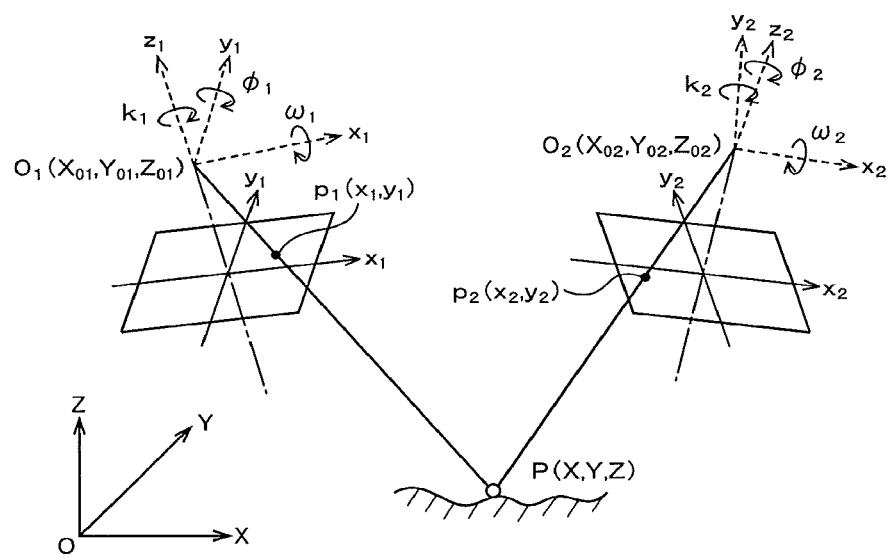
FIG. 8 is a principle diagram for a forward intersection method.

After the matching relationships of the feature points between the two images, which are taken from the mobile vehicle and constitute a stereoscopic image, are identified, the three-dimensional positions of the feature points are calculated (step S206). The three-dimensional positions of the feature points are calculated by a forward intersection method as shown in FIG. 8. Hereinafter, a principle for calculating the positions of the feature points by the forward intersection method is described.

It is assumed that there are a first image taken from the mobile vehicle and a second image taken from the mobile vehicle and that a feature point "P" that matches between the first and the second images is identified. Here, the position $O_1$ and the attitude of a camera at the time when the camera photographs the first image, and the position $O_2$ and the attitude of the camera at the time when the camera photographs the second image, are known from data of the flight log. Image coordinate values $p_1(x_1, y_1)$ of the feature point "P" contained in the first image and image coordinate values $p_2(x_2, y_2)$ of the feature point "P" contained in the second image are respectively obtained from each of the first and the second images.

Here, the position $O_1$ and the image coordinate values $p_1(x_1, y_1)$, and the position $O_2$ and the image coordinate values $p_2(x_2, y_2)$, are respectively connected by directional lines. Then, coordinate values of the intersection point "P" of the two directional lines are calculated, whereby the three-dimensional position of the feature point at the position of the intersection point "P" is calculated. According to this principle, the three-dimensional position of the feature point extracted from the image taken from the mobile vehicle is calculated. This calculation is performed on all of the feature points that are extracted from each of the images taken from the mobile vehicle.

After the positions of the feature points are calculated, the positions (three-dimensional positions) of the feature points corresponding to the targets, which are already detected from each of the images taken from the mobile vehicle in step S203, are obtained (step S207). For example, it is assumed that a target is detected at the position with the image coordinate values $p_1$ in the model shown in FIG. 8. In this case, by obtaining three-dimensional coordinate values of the point "P" or the feature point in the vicinity of the point "P", the three-dimensional position of the target, which is detected from the still image (image taken from the mobile vehicle) on the left side and has the image coordinate values $p_1$, is obtained. At this stage, since actual dimensions are not added, the obtained coordinate values of the three-dimensional position are relative values. The above calculation of the three-dimensional position is performed on all of the detected targets.

Then, a three-dimensional TIN model having apexes at the positions of the obtained targets, which are detected from the images taken from the mobile vehicle in step S203, is generated, and a 3D relative model is obtained (step S208). The 3D relative model is a relative model not added with actual dimensions. Hereinafter, a specific example of the processing in generating a 3D relative model is described. First, the feature point, which coincides with or is closest to the image position of the target that is detected in step S203, is searched among the feature points that are extracted in step S204 and that are identified in step S205. Then, the three-dimensional position of the found feature point is obtained from the result in step S206. This three-dimensional position of the feature point at this stage is a relative position. The processing of this step is performed on all of the targets that are detected in step S203.

In the processing of this step, if the detected target is extracted as a feature point, since the three-dimensional position of this detected target is already calculated in step S206, these calculated values are used. Thus, the three-dimensional positions (relative three-dimensional positions) of the multiple targets that are detected in step S203 are calculated. Then, a three-dimensional TIN model, which has apexes at the three-dimensional positions of the multiple targets that are detected from the images taken from the mobile vehicle, is obtained as a 3D relative model. The above is an example of the processing, and such processing is performed in step S208.

Matching Between 3D Reference Point Model and 3D Relative Model

Here, first, processing for identifying a matching relationship between the 3D reference point model, which is obtained in the processing shown in FIG. 2, and the 3D relative model, which is obtained in the processing shown in FIG. 4, is described. Then, processing for obtaining the position of a reference point (located position of the target) in the 3D relative model is described. In this processing, the similarity of the positions of the points between the 3D reference point model and the 3D relative model is quantitatively evaluated. Then, by using the result of the quantitative evaluation, a matching relationship between the points constituting the TIN of the 3D reference point model and the points constituting the TIN of the 3D relative model is calculated.

Figure 5:
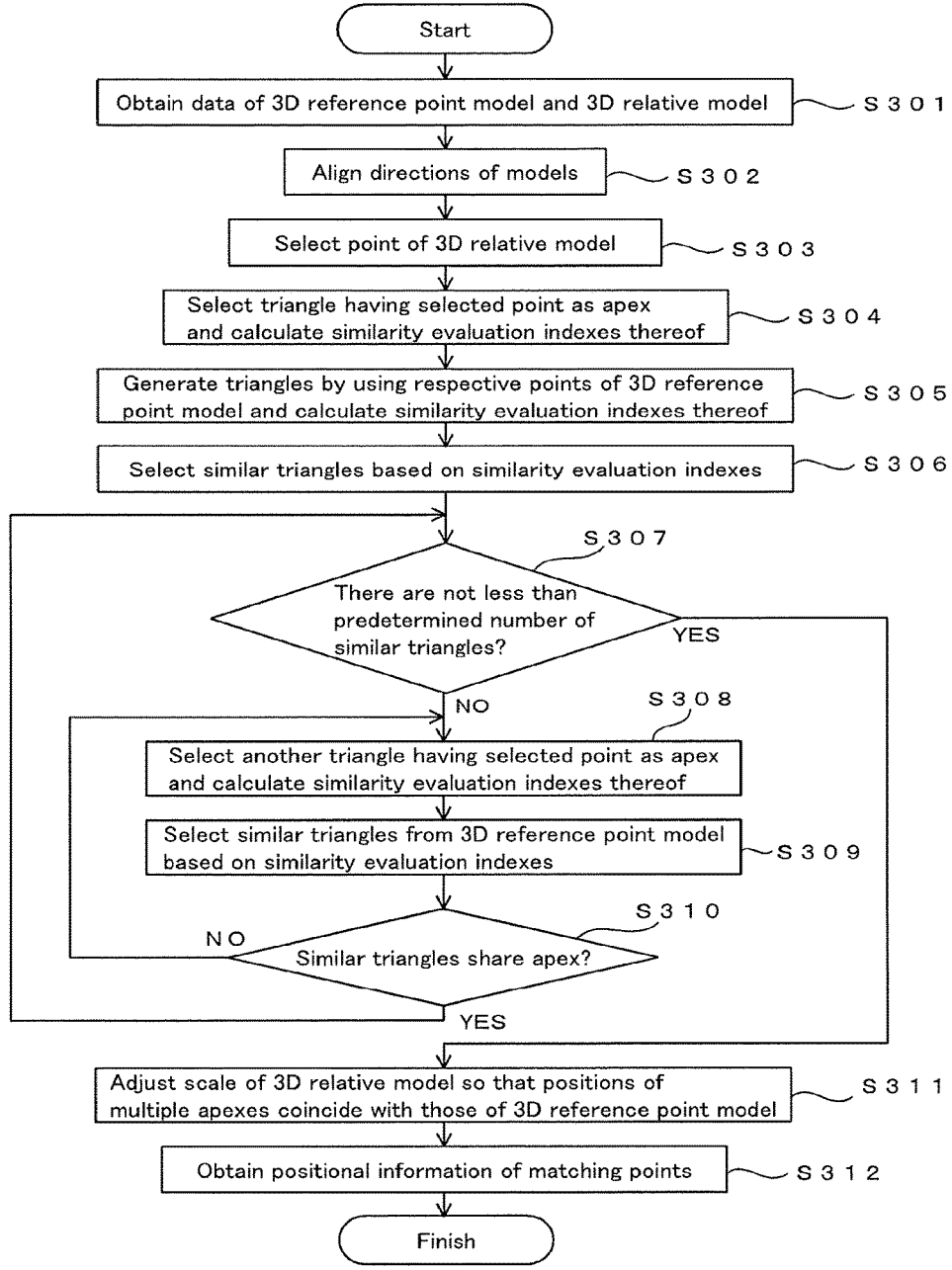
FIG. 5 is a flow chart showing an example of a processing procedure.

FIG. 5 shows an example of a procedure for executing the above processing. Programs for executing the processing shown in FIG. 5 are stored in an appropriate storage medium or a storage region and are executed by hardware shown in FIG. 11.

First, the 3D reference point model that is generated in the processing shown in FIG. 2, and the 3D relative model that is generated in the processing shown in FIG. 4, are obtained (step S301), and these two models are aligned in the same direction (step S302). Here, information of the direction of the camera at the time when the camera photographed a selected image is obtained from the data of the IMU in the flight log, and the direction of the 3D relative model is aligned with the direction of the 3D reference point model based on this information.

Figure 9A:
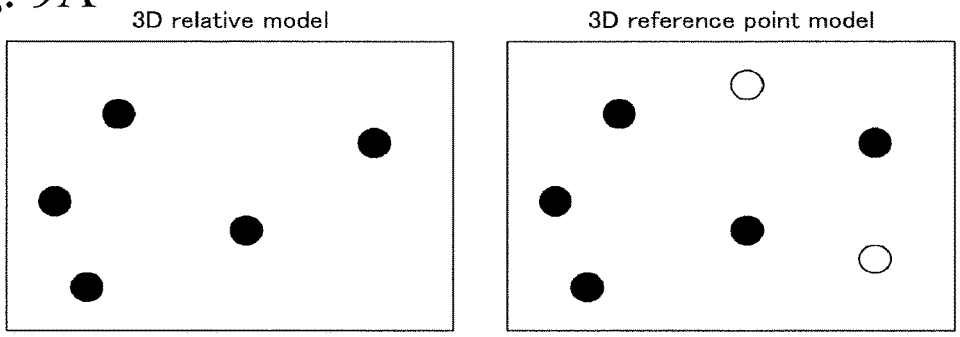
FIGS. 9A to 9D are explanatory diagrams for explaining matching processing of 3D models.

FIG. 9A shows a 3D relative model on the left side and a 3D reference point model on the right side as viewed from a specific viewpoint. FIGS. 9A to 9D show black circles representing common reference points (target positions), which are extracted from both the 3D relative model and the 3D reference point model. FIGS. 9A to 9D also show white circles representing reference points (target positions), which are not detected at the time of generating the 3D relative model but are recognized in the 3D reference point model.

First, a point of the apex for constituting the TIN is selected in the 3D relative model (step S303). Then, a triangle having apexes at the selected point and the other points is formed, and similarity evaluation indexes of the triangle are calculated (step S304). A condition in which a point is selected and a triangle having an apex at the selected point is selected in the 3D relative model is shown on the left side in FIG. 9B.

Figure 10:
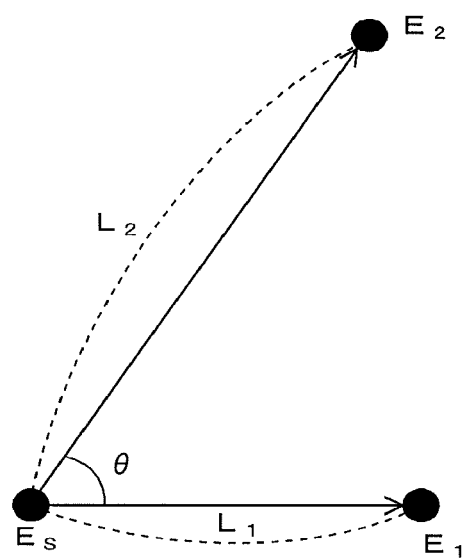
FIG. 10 is an explanatory diagram for explaining a method for quantitatively evaluating the shape of a triangle that constitutes a TIN.

Hereinafter, the similarity evaluation indexes are described. The similarity evaluation indexes are indexes for evaluating the similarity between one triangle and other triangles. That is, the similarity evaluation indexes are indexes for detecting a triangle that has a shape similar to that of one triangle. FIG. 10 shows apexes $E_S$, $E_1$, and $E_2$ of a triangle. Here, the apex $E_S$ corresponds to the point that is selected in step S303. In this case, the similarity evaluation indexes are $(L_1, L_2, \theta)$.

Figure 9B:
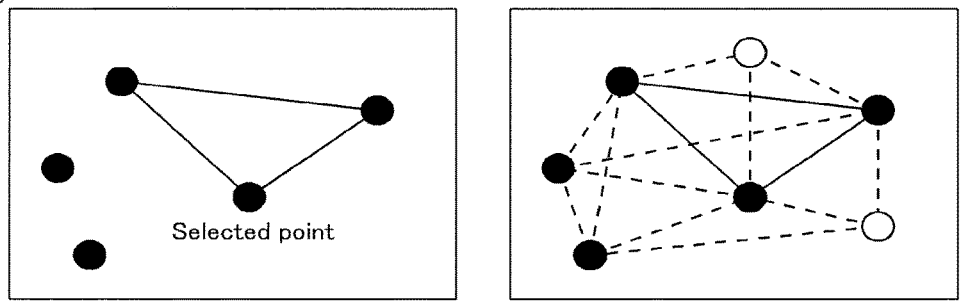

After step S304, all of triangles having an apex at one point are selected with respect to all of the points of the 3D reference point model, and then the similarity evaluation indexes of each of these triangles are calculated (step S305). Then, triangles that are similar between the 3D relative model and the 3D reference point model are selected by using the similarity evaluation indexes that are calculated in step S304 and step S305 (step S306). FIG. 9B shows a case in which a triangle that is similar to a triangle in the 3D relative model on the left side is selected from the 3D reference point model on the right side.

The similarity is evaluated in step S306 as described below. First, the similarity evaluation indexes for the 3D relative model are represented as $(L_1, L_2, \theta)$, and the similarity evaluation indexes for the 3D reference point model are represented as $(T_1, T_2, \phi)$. Here, $T_1$ is a length corresponding to $L_1$, $T_2$ is a length corresponding to $L_2$, and φ is an angle corresponding to θ. Then, assuming that standard lengths are $L_S$ and $T_S$, a difference $\Delta m_i$ of the length of the side between the triangles is calculated from the Second Formula.

$$\Delta m_i = (L_i/L_S) - (T_i/T_s) \qquad \text{Second Formula}$$

Moreover, a difference $\Delta a_i$ of the angle formed by selected two sides between the triangles is calculated from the Third Formula.

$$\Delta a_i = \theta - \phi \qquad \text{Third Formula}$$

Then, a similarity "S" is calculated from the Fourth Formula assuming that the remainder of each pair of the triangles between the two models is represented by $j(\Delta m_i, \Delta a_i)$.

$$S = \Sigma_{i=1}^n S_i = \Sigma_{i=1}^n \exp(-r \cdot j(\Delta m_i, \Delta a_i)) \qquad \text{Fourth Formula}$$

Here, the Fourth Formula is calculated assuming that "n"=2, "r" is a Gibbs distribution coefficient, $L_S = L_1$, and $T_S = T_1$. In the calculation of the Fourth Formula, when the similarity is higher, the value of "S" approaches 1. In step S306, triangles that are similar to the triangles set in the 3D relative model are searched in the 3D reference point model by using the Fourth Formula.

Multiple similar triangles may be selected from the 3D reference point model. This is because the value that is calculated from the Fourth Formula essentially contains a margin of error, and therefore, it is probable that multiple triangles having no significant differences are found in the 3D reference point model.

After step S306, the processing advances to step S307. In step S307, whether the number of the pairs of the selected triangles that are similar between the 3D relative model and the 3D reference point model is not less than a predetermined number (for example, six) is judged. If the predetermined value of the number of the pairs (threshold value) for the judgment criteria in step S307 is made great, the matching relationship between the 3D reference point model and the 3D relative model is calculated with higher precision or the probability of mistakenly calculating the matching relationship is decreased, but the burden of the operation is increased. Therefore, the threshold value to be used in step S307 is determined considering the number of the reference points to be calculated, the matching precision, the performance of hardware for the operation, acceptable operation time, etc. Naturally, the threshold value may be made variable, and the set value may be changed according to the situation.

Since a large number of triangles are formed in the TIN models, there is a high probability of the existence of triangles that coincide with each other between the two models, although the triangles are differently positioned from each other. In the first place, in the case of containing margins of errors, this probability is more increased. Therefore, in order to improve the precision of identifying the matching relationship between the two TIN models based on the similarity of the triangles that constitute the TIN models, the processing in step S307 is performed.

When the number of the pairs of the similar triangles is not less than a predetermined number in the judgement in step S307, the processing advances to step S311. Otherwise, the processing advances to step S308. In step S308, another triangle having an apex at the point, which is selected in step S303, is further selected. An example of this condition is shown in FIG. 9C.

After step S308, the processing advances to step S309, and the same processing as in step S306 is performed on the triangle selected in step S308. Then, after the processing in step S309 is performed, whether a triangle that is newly selected from the 3D reference point model shares the apex with the triangle that is selected from the 3D reference point model in step S306 is judged (step S310).

For example, if the triangle that is selected in step S309 does not share the apex with the triangle that is selected in step S306, these triangles are separated from each other and are originally not triangles that correspond to the triangles in the 3D relative model. In this case, the judgment in step S310 results in NO, and the processing returns to step S308 so that another triangle is selected again.

Figure 9C:
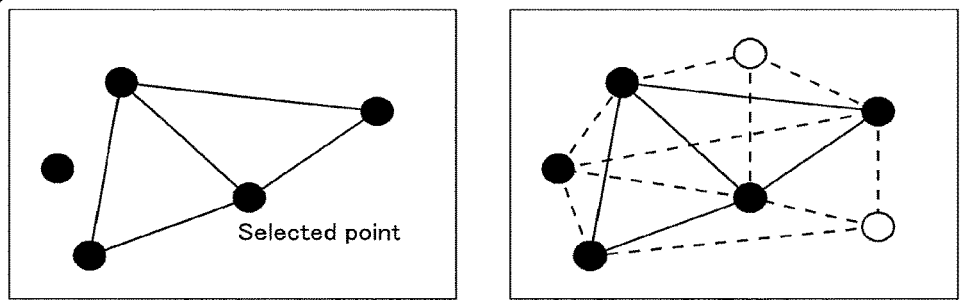

FIG. 9C shows a case in which two triangles corresponding to the two triangles, which share apexes with each other in the 3D relative model, are selected in the 3D reference point model. In such a case, the judgment in step S310 results in YES.

Figure 9D:
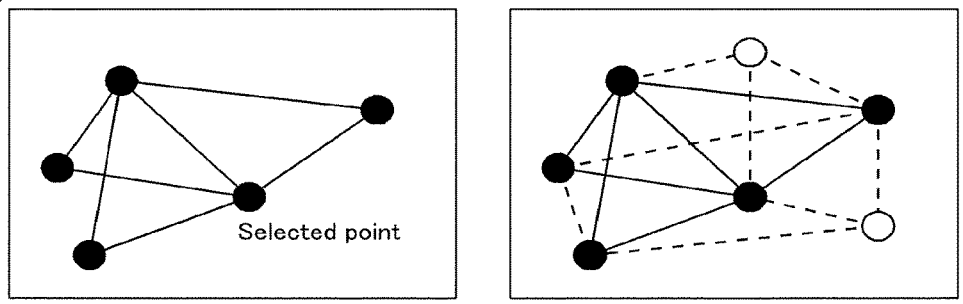

When the judgment in step S310 results in YES, the processing in step S307 and in the subsequent steps is executed again. When some similarities between the triangle networks are obtained as shown in FIG. 9D, the judgment in step S307 results in YES, and the processing advances to step S311. In step S311, the scale of the 3D relative model is adjusted so that each of the apexes in the 3D relative model matches with each of the apexes in the 3D reference point model, respectively. At this time, the direction may also be finely adjusted.

After step S311, the processing advances to step S312. Then, the positional information of each of the apexes in the 3D reference point model (this information is already obtained in step S102 shown in FIG. 2) is obtained as the positional information of each of the corresponding apexes in the 3D relative model. Thus, the positional information of each of the apexes that constitute the 3D relative model is obtained. In addition, the positional information of the reference points, which are represented by the white circles in FIGS. 9A to 9D and are not detected in the 3D relative model, is also obtained. Since the 3D relative model is generated based on the images taken from the mobile vehicle, by identifying the three-dimensional positions of the reference points in the 3D relative model, the three-dimensional positions (three-dimensional positions in a map coordinate system) of the reference points in the images taken from the mobile vehicle are determined. It should be noted that the map coordinate system is a coordinate system that is used in a GNSS or that is used for describing a topographic map. Results of a survey that is performed by a TS or the like are described by the map coordinate system.

Hereinafter, an example of processing for identifying the three-dimensional positions of the reference points in the images taken from the mobile vehicle will be described by using FIG. 8. In this case, the point "P" is the point (position of target; reference point) of which the position is identified in the 3D relative model. The image on the left side and the image on the right side are two images that are taken from the mobile vehicle and that constitute a stereoscopic image, in which the point "P" is stereoscopically viewed. Here, the image coordinate values $p_1$ and $p_2$ of the point "P" in the respective images are known from the image data. Therefore, the three-dimensional position of the point "P" at the position with the image coordinate values $p_1$ in the image on the left side, and the three-dimensional position of the point "P" at the position with the image coordinate values $p_2$ in the image on the right side, are known. According to the principle described above, the three-dimensional positions of the reference points in the images taken from the mobile vehicle are identified In the processing shown in FIG. 5, by using the similarity of the triangles that constitute the TIN models, the matching relationship between the 3D reference point model, in which the positions of the reference points are known, and the 3D relative model, in which the positions of the reference points are unknown, is identified. Then, by using this matching relationship, the positional information of each of the apexes (positional information of the reference points) in the 3D relative model is obtained from the positional information of each of the apexes in the 3D reference point model.

According to this embodiment, by identifying the matching relationship between the 3D reference point model and the 3D relative model, the positional information of the targets in the 3D relative model is obtained. That is, the 3D reference point model is a model based on the positions of the targets, which are measured on the ground, and the position of the target (position of the reference point) at each of the apexes is known. In contrast, regarding the position of the target that constitutes each of the apexes of the 3D relative model, the relative positional relationship is calculated, but the absolute position is unknown in the stage of generating the 3D relative model. Therefore, by identifying the matching relationship between the 3D reference point model and the 3D relative model, the positions of the reference points in the 3D relative model are identified from the positions of the apexes of the 3D reference point model.

High Precision Identification of Position of Target in Image Taken from Mobile Vehicle By performing the processing shown in FIG. 5, the positions (positions in the map coordinate system) of the targets in the 3D relative model are identified, and the positions of the reference points (positions of the targets) in the images taken from the mobile vehicle are also identified. Here, an example of processing for identifying the positions of reference points (targets), which are not reliably detected from the images taken from the mobile vehicle, with high precision by further performing the following steps is described. By performing the processing shown in FIG. 5, the positions of the targets in the 3D relative model can be identified. Here, image matching is performed by using the result of the processing shown in FIG. 5, and the positions of the targets are detected with high precision from the images taken from the mobile vehicle.

Basically, the targets are detected from the images taken from the mobile vehicle in step S203 shown in FIG. 4, but the step S203 is a rough detection processing for preferentially detecting targets that are easily detectable, such as targets that are vividly photographed in the images, and existence of undetected targets is allowable. However, by performing the processing described below, targets that cannot be detected in step S203 shown in FIG. 4 are detected, and precisely, the positions of the targets are detected.

Figure 6:
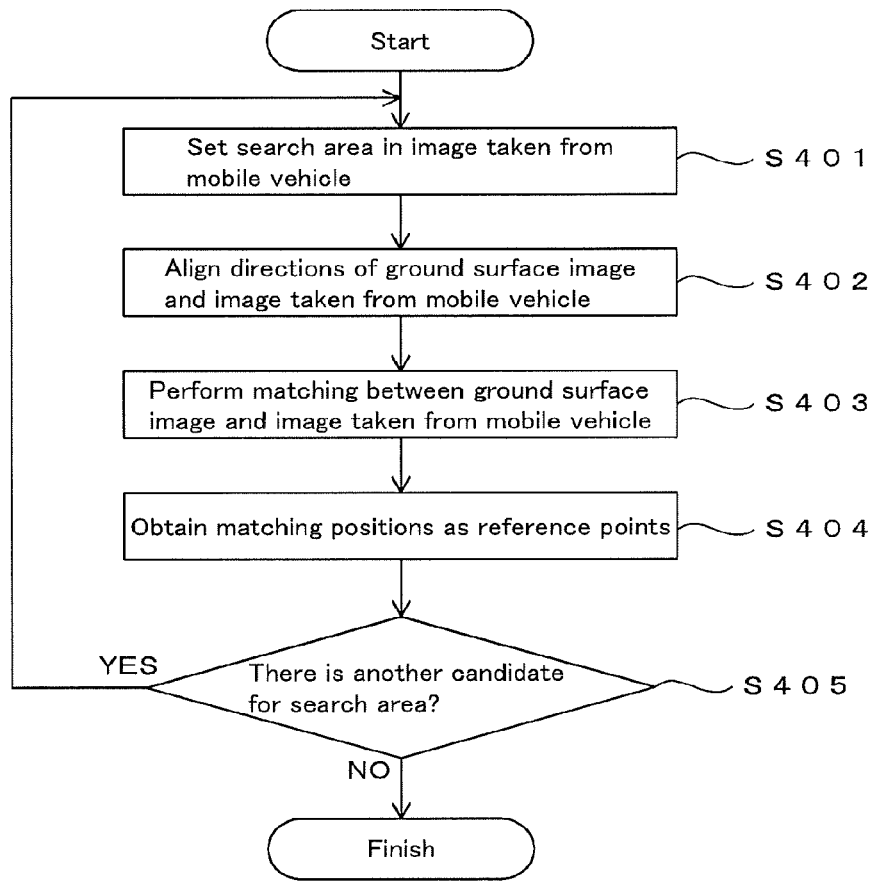
FIG. 6 is a flow chart showing an example of a processing procedure.

FIG. 6 shows an example of processing for identifying the positions of the targets in the image taken from the mobile vehicle. According to the processing shown in FIG. 6, a matching relationship between the ground surface image and the image taken from the mobile vehicle is examined, whereby the position of the target in the image taken from the mobile vehicle is identified. Programs for executing the processing shown in FIG. 6 are stored in an appropriate storage medium or a storage region and are executed by hardware shown in FIG. 11.

In this processing, first, a search area is set at an estimated position of a specific target in the image taken from the mobile vehicle (step S401). Specifically, one ground surface image is selected, and an area corresponding to the selected ground surface image (this matching relationship is identified in the processing shown in FIG. 5) is set as a search area in the image taken from the mobile vehicle. That is, the position of the apex of the 3D relative model, which is obtained from the positional information of the apex of the 3D reference point model, is used as an estimated position, and a specific area having a center at the estimated position is set as a search area.

This processing is described in further detail by using FIG. 8. For example, it is assumed that the point "P" shown in FIG. 8 is a reference point (position of target) that is estimated in the 3D relative model. In this case, the image on the left side is the first image constituting a stereoscopic image that is used for generating the 3D relative model, and the image on the right side is the second image constituting the stereoscopic image that is used for generating the 3D relative model. The symbol $p_1$ represents the image coordinate values of the point "P" in the image on the left side, which is taken from the mobile vehicle, and the symbol $p_2$ represents the image coordinate values of the point "P" in the image on the right side, which is taken from the mobile vehicle.

By obtaining the estimated position of the target that is represented by the point "P", a corresponding estimated position $p_1$ of the target in the image on the left side, and a corresponding estimated position $p_2$ of the target in the image on the right side, are determined. Then, a search area having the estimated position $p_1$ of the target at the center is specified, whereby a search area for targets is set in the image on the left side. Also, a search area having the estimated position $p_2$ of the target at the center is specified, whereby a search area for targets is set in the image on the right side.

In this processing, the search area is set in the image taken from the mobile vehicle so as to contain the positions indicated by the white circles in addition to the positions indicated by the black circles shown in FIGS. 9A to 9D. The white circles indicate the positions of the targets that are not detected from the images taken from the mobile vehicle (these positions of the targets may be detected by more detailed detection processing using an enlarged image). Therefore, even when the precision of the processing is relatively low and there is detection failure in step S203 shown in FIG. 4, the search area is set without omission in the processing in step S401. Moreover, according to this processing, processing that does not require an excessive burden can be performed in step S203, whereby the entirety of the processing is more efficiently performed.

As the search area, for example, an area of 10 meters by 10 meters having the estimated position of the target at the center is selected. Here, the search area is set for the target of which position is measured with high precision by a TS or a high precision GNSS.

The search area image is an enlarged image of a small area of a part of the image taken from the mobile vehicle, and therefore, matching with the ground surface image, which is described later, is performed with high precision. Since the area to be matched is limited in advance, the burden on the hardware necessary for the matching is reduced, whereby operation efficiency, calculation precision, and consumption of electric power are improved.

After the search area is set, the direction of the ground surface image and the direction of the image taken from the mobile vehicle are aligned by projection conversion (step S402). The method of aligning the directions of the images includes the following three methods. That is, a method (1) is aligning the direction of the ground surface image with the direction of the image taken from the mobile vehicle. A method (2) is aligning the direction of the image taken from the mobile vehicle with the direction of the ground surface image. A method (3) is aligning the directions of the ground surface image and the image taken from the mobile vehicle, in a specific direction.

Hereinafter, a method of aligning the directions of the images is exemplified. It should be noted that a camera is fixed on a UAV so as to face vertically downward in the following descriptions. First, an example of the method (1) is described. In this case, the ground surface image is subjected to the projection conversion so that the shape of the target, which is shown in FIG. 3, will be square in the ground surface image. Thus, the ground surface image and the image taken from the mobile vehicle can be compared with each other as viewed from vertically above. The UAV may roll or pitch while flying, and differences in the conditions of photographing from the conditions of photographing from right above increases as the image reaches the peripheral part of the photographing visual field, but these effects are ignored here.

Next, an example of the method (2) is described. In this case, the ground surface image is tilted so that the shape of the target, which is shown in FIG. 3, will be square in the ground surface image, and an angle between the direction of the ground surface image and the vertical direction is calculated. The image taken from the mobile vehicle is subjected to the projection conversion based on this angle, whereby the directions of the ground surface image and the image taken from the mobile vehicle are aligned with each other.

Next, an example of the method (3) is described. For example, it is assumed that the attitude of the camera at the time when a selected image is taken from the mobile vehicle is shifted from the vertical direction (this information is obtained from the flight log). In this case, the selected image taken from the mobile vehicle is subjected to the projection conversion so as to be in a condition of being seen from the vertical direction. On the other hand, the ground surface image is also subjected to the projection conversion so as to be in a condition of being seen from the vertical direction, that is, so that the shape of the target, which is shown in FIG. 3, will be square in the ground surface image. Thus, the directions of the ground surface image and the image taken from the mobile vehicle are aligned with each other.

After the directions of the images are aligned with each other, the matching relationship between the ground surface image (image 1) and an image (image 2) at the search area of the image taken from the mobile vehicle is examined (step S403). As for this processing, a technique of matching images, that is, a technique of identifying a matching relationship between two images is used. For example, feature points are extracted from the images 1 and 2, which are comparison targets. Then, a matching relationship between the feature point in the image 1 and the feature point in the image 2 is identified by template matching, whereby the images 1 and 2 are matched with each other. As the technique for matching two images with each other, for example, a technique disclosed in Japanese Unexamined Patent Application Laid-Open No. 2013-178656 or 2014-035702 may be used. If the images 1 and 2 cannot be matched with each other, the processing is not appropriately performed, and the processing for matching the target search area is terminated.

In the processing in step S403, the images 1 and 2 are matched with each other (matching relationship is identified). At this time, the image of the target is not necessarily required. Naturally, the image of the target may exist. For example, the matching of the images 1 and 2 uses images of the geographical shape, stones, and the like, which surround the target, and therefore, the image of the target is not necessarily required. Therefore, even when the image of the target cannot be recognized at all or cannot be completely recognized in the image taken from the mobile vehicle, the position of the target (position of reference point) is identified in the image taken from the mobile vehicle. Moreover, since the matching uses images other than the target that are photographed in both of the images 1 and 2, the position of the target is identified with high precision in the image taken from the mobile vehicle compared with a case of detecting only the images of the target.

After the matching relationship between the images 1 and 2 is identified, positional information of the target in the image 2 is obtained from the positional information of the target in the image 1 (step S404). Thus, the position of the reference point is identified in the image taken from the mobile vehicle, based on the matching of the images. Although an approximate position of the reference point in the image taken from the mobile vehicle is identified in the processing shown in FIG. 5, the position of the reference point is more precisely identified in the image taken from the mobile vehicle, by further performing the processing shown in FIG. 6. Even when the target is not clearly photographed in the image 2 (enlarged image of a part of the image taken from the mobile vehicle), the position of the target is identified with high precision in the image 2 in a condition in which the entirety of the image taken from the mobile vehicle is matched with the ground surface image. That is, the positions of targets that cannot be correctly detected or that are not detected from the images taken from the mobile vehicle in step S203 shown in FIG. 4 are identified in the images taken from the mobile vehicle, by performing the processing shown in FIG. 6.

After the images 1 and 2 are matched with each other in step S403, the image 1 can be used as an enlarged image of a part of the image 2. That is, the image 1 is an image that is taken by photographing a part of the object in the image 2 from a different viewpoint near the target. Therefore, after the images 1 and 2 are matched with each other, the image 1 can be used as an enlarged image of a part of the image 2. By using this function, objects that are not clearly shown in the image 2 can be recognized in the image 1.

After step S404, whether there is another candidate for an area to be searched is judged (step S405). When there is a candidate for another area to be searched, the processing in step S401 and in the subsequent steps is repeated. Otherwise, the processing is terminated.

According to this processing, by matching the ground surface image and the image taken from the mobile vehicle with each other by using the matching relationship of the TIN models, the positions of the targets (reference points) in the image taken from the mobile vehicle are identified with high precision. By identifying multiple reference points in the image taken from the mobile vehicle, actual dimensions are added to the three-dimensional model that is obtained from the images taken from the mobile vehicle. The three-dimensional model is generated based on the images taken from the mobile vehicle, by the 3D topographic model generating unit 116 shown in FIG. 11. This technique is a publicly known technique, and therefore, detail descriptions thereof are omitted. The details of this technique are as disclosed in Japanese Unexamined Patent Applications Laid-Open Nos. 2014-035702 and 2012-230594, for example.

SUMMARY

As described above, in this embodiment, the following steps are performed in this order. First, a step (step S103, step S202) of receiving first data and second data is performed. The first data contains data of first images (in the above example, the ground surface images), which are obtained by photographing each of multiple reference points located on the ground surface, and data of three-dimensional positions of the multiple reference points. The second data contains data of second images (in the above example, the images taken from the mobile vehicle), which are obtained by photographing an area containing the multiple reference points from a UAV that is an example of a mobile vehicle. Then, a step (step S104) of generating a first shape model (in the above example, the 3D reference point model) that has an apex at each of the three-dimensional positions of the multiple reference points contained in the first data is performed. Moreover, a step (step S203) of detecting images of the reference points from the second images, and a step (step S208) of generating a second shape model (in the above example, the 3D relative model) that has an apex at each of the reference points detected from the second images, are performed. Next, a step (the processing shown in FIG. 5) of identifying a first matching relationship between the first shape model and the second shape model is performed. Then, a step (step S312) of obtaining an estimated position of the reference point in a selected second image among the second images is performed based on the first matching relationship. Furthermore, a step (step S403) of identifying a second matching relationship between the first image, which corresponds to the selected second image, and the selected second image are performed based on the estimated position of the reference point. Then, a step (step S404) of identifying a three-dimensional position of the reference point in the selected second image is performed based on the second matching relationship.

That is, in this embodiment, the located targets are photographed from short distances, and the locations of the targets are measured. Then, a 3D reference point model is generated by using the measured locations of the targets as apexes. On the other hand, the positions of the targets, which are detected from the images taken by the UAV from the air, are calculated from the three-dimensional model that is generated by the principle of stereoscopic three-dimensional measurement, whereby a 3D relative model constituted of a TIN is obtained. Then, a matching relationship between the 3D reference point model and the 3D relative model is identified. Since the three-dimensional position of each of the reference points at the apexes of the 3D reference point model is obtained in advance, the three-dimensional positions of the reference points are obtained in the 3D relative model at this stage.

The 3D relative model is generated based on the images taken from the mobile vehicle. Therefore, after the positions of the reference points (positions of targets) in the 3D relative model are identified, the positions of the reference points in the images taken from the mobile vehicle are determined by reflecting this positional information. Specifically, a position, which corresponds to a specific position in the 3D relative model, in the image, which is taken from the mobile vehicle and is a base of the 3D relative model, is known by the principle shown in FIG. 8. Therefore, by identifying the positions of the targets in the 3D relative model, the positions of the targets in the images taken from the mobile vehicle are determined (step S312).

There may be cases in which the 3D relative model contains margins of errors, and there may be probability that the 3D relative model contains a position of an undetected or a misdetected target (reference point). In contrast, in the 3D reference point model, since the results of respectively measuring the positions of the targets are used, the reliability and the precision of the position of the reference point at each apex are high. In view of this, the ground surface image and the image taken from the mobile vehicle are matched with each other by using the positional information of the reference points in the 3D relative model, which is calculated based on the matching relationship between the 3D reference point model and the 3D relative model. Then, the positions of the reference points in the images taken from the mobile vehicle are identified. According to this processing, positional information of the reference points in the images taken from the mobile vehicle is obtained with further high precision (step S404).

In the processing shown in FIG. 6, a search area is set in the image taken from the mobile vehicle, based on the positional information of the reference point in the image taken from the mobile vehicle, which is obtained based on the matching relationship between the 3D models. Then, the search area and the ground surface image are matched with each other, whereby the position of the reference point (target) is identified in the search area with high precision. The positions of the reference points can be identified in the images taken from the mobile vehicle, by the processing shown in FIG. 5. Nevertheless, by performing the processing shown in FIG. 6 in addition to the processing shown in FIG. 5, the reference points can be identified in the images taken from the mobile vehicle with further high precision. Moreover, by performing the processing shown in FIG. 6, the position of the reference point, which cannot be identified in the processing shown in FIG. 5 because the target is not clearly photographed in the image taken from the mobile vehicle or due to other reasons, is identified in the image taken from the mobile vehicle.

According to the processing in FIG. 6, the position of the target, which is not clearly shown in the image taken from the mobile vehicle and has a probability of being undetected by conventional automatic detection, is reliably identified in the image taken from the mobile vehicle. In addition, although misdetection is likely to occur in automatic detection in general, the probability of occurrence of misdetection of the target is very low in the processing shown in FIG. 6 because the ground surface image is taken from a short distance and thereby clearly shows the target. Therefore, by using the result of matching the ground surface image and the image taken from the mobile vehicle, the probability of occurrence of misidentification of the position of the target in the image taken from the mobile vehicle is reduced.

For the above reasons, in this embodiment, the positional information of the reference points in the images that are taken by the UAV is obtained with high precision by automatic detection using software processing. Accordingly, the burden on an operator for confirming errors of the reference points, and for selecting the reference points manually, which are performed in conventional techniques, is greatly reduced.

2. Second Embodiment

In the calculation of the similarity evaluation indexes in step S304, triangles constituting the TIN are used. Alternatively, the calculation of the Second Formula to the Fourth Formula may be performed on at least four line segments from a selected point to other points. In this case, a relative positional relationship between the selected point and each of the points surrounding the selected point is quantitatively evaluated, and the selected point is characterized. That is, parameters that quantitatively evaluate the relationships between the selected point and at least four other points are obtained as similarity evaluation indexes. When the variety of the relationships between the selected point and the other points is increased, the parameters for characterizing the selected point is more differentiable, and the selected point is more quantitatively differentiated from the other points. Accordingly, the precision of the matching between the 3D reference point model and the 3D relative model is further improved.

3. Third Embodiment

Another example of the method for identifying the matching relationship between the 3D reference point model and the 3D relative model is described. The following processing may be used instead of or in conjunction with the processing in FIG. 5.

Figure 12A:
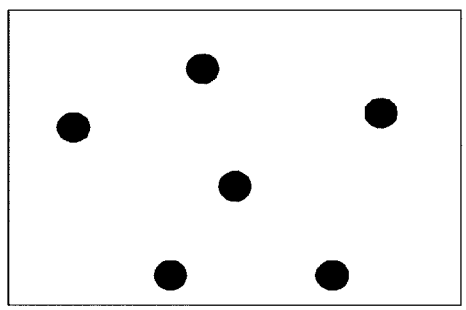
FIGS. 12A to 12C are explanatory diagrams for explaining matching processing of a 3D model.

First, it is assumed that a 3D reference point model and a 3D relative model are viewed from a specific direction such as an upward vertical direction. FIG. 12A shows a 3D reference point model, which is constituted of six reference points represented by black circles, as viewed from a specific angle. Here, four of the reference points are selected, and a quadrilateral is formed. An example of the quadrilateral is shown on the left side in FIG. 12B. After the quadrilateral is selected, the gravity center position, which is represented by a white circle, is obtained. Next, the distance from the gravity center position and each of the reference points and the angle θ are calculated and are summarized by a histogram as shown on the right side in FIG. 12B.

Figure 12B:
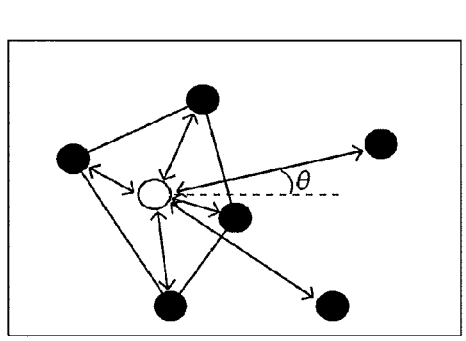
Figure 12B:
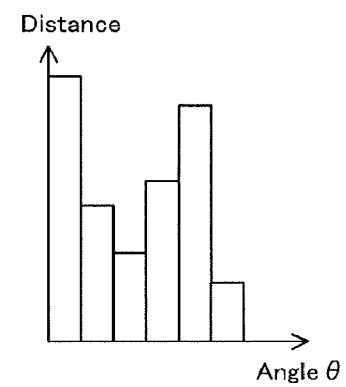
Figure 12C:
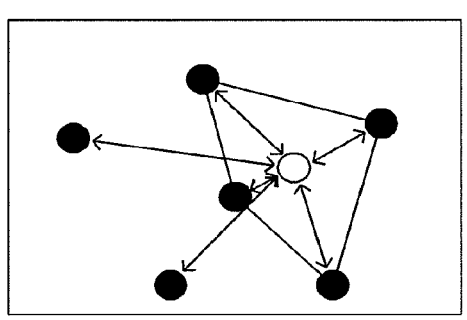
Figure 12C:
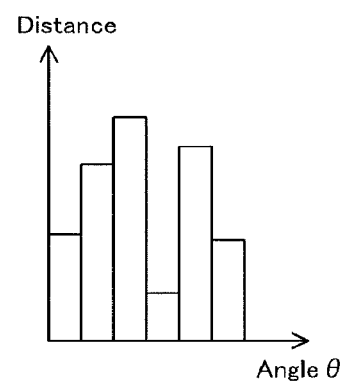

The above work is performed on a quadrilateral that is constituted of another set of four points. An example of selecting a quadrilateral that is different from that in FIG. 12B is shown in FIG. 12C. By changing the set of the reference points for constituting the quadrilateral, the shape of the histogram is also changed. The above processing is performed on each quadrilateral by a number within a formable number of the quadrilaterals.

After the processing relating to FIGS. 12A to 12C is performed on the 3D reference point model, the similar processing is also performed on the 3D relative model. Then, one of the histograms of one of the groups is selected, and a histogram that is similar to the selected histogram is searched in the other group. For example, one histogram of the 3D reference point model is selected, and a histogram similar to the selected histogram is searched among the histograms of the 3D relative model.

The histograms are compared with each other by shifting the rectangles of the histograms in the horizontal axis direction one by one, whereby the influence of rotation is absorbed. At this time, a coefficient (scale) is multiplied with one of the histograms so that the remainder will be minimum. Normally, multiple histograms tend to be found as histograms similar to the selected histogram. Therefore, the found multiple histograms are subjected to voting, and the top histograms that have higher similarity are selected by a multiple number, for example, 10. For example, when a quadrilateral in the 3D reference point model is selected, the multiple top histograms that have higher similarity to the selected histogram are selected in the 3D relative model.

Next, information of the quadrilaterals corresponding to the selected histograms is obtained. That is, information of the four reference points that constitute the selected quadrilateral in the 3D reference point model, and information of the multiple quadrilaterals selected in the 3D relative model, are obtained. Then, conversion coefficients between two quadrilaterals that are expected to correspond with each other are calculated. The conversion coefficients are conversion coefficients of rotation and movement, which are necessary for matching one quadrilateral with the other quadrilateral, or projection conversion coefficients. After the conversion coefficients are calculated, the conversion coefficients are used for converting the selected quadrilateral in the 3D reference point model into a quadrilateral that is selected in the 3D relative model and that is expected to have a similarity, or vice versa, and the positions of the apexes of both of the quadrilaterals are compared with each other.

For example, the selected quadrilateral in the 3D reference point model after it is converted into a quadrilateral in the 3D relative model, is compared respectively with the quadrilateral of a first candidate, a second candidate, a third candidate, . . . , in the 3D relative model.

Then, the remainders of the positions between the points constituting the apexes of the quadrilaterals that are compared with each other are calculated, and the points of the group that has the least total of the remainders are determined as matching points. Thus, four points that correspond to the four reference points constituting the 3D reference point model and that constitute the 3D relative model are determined.

The above processing is performed by the number of the selected quadrilaterals, whereby matching points of the 3D relative model are determined with respect to all of the points that are identified in the 3D reference point model.

Although a quadrilateral is used in the above descriptions (in the example shown in FIGS. 12A to 12C), a polygon such as a triangle or a pentagon may be selected, and a histogram may be generated by calculating the gravity center of the polygon.

4. Fourth Embodiment

In this embodiment, an average value of all of the points constituting the 3D reference point model as viewed from a specific angle is used as the gravity center, and a histogram similar to those in FIGS. 12B and 12C is generated. On the other hand, an average value of all of the points constituting the 3D relative model as viewed from a specific angle is used as the gravity center, and a histogram similar to those in FIGS. 12B and 12C is generated. Then, a matching relationship between the two generated histograms is examined by shifting the rectangles of the two generated histograms in the direction of the axis for the angle. Details of this processing are the same as in Third Embodiment. After the matching relationship is identified, positional information of the points of the 3D reference point model corresponding to the points that constitute the 3D relative model is obtained, and three-dimensional positional information of the points constituting the 3D relative model is obtained.

5. Fifth Embodiment

The matching relationship between each of the points (reference points) constituting the 3D reference point model and each of the points constituting the 3D relative model may be identified by a RANSAC (Random sample consensus) method or an LMedS (Least Median of Squares) method. For example, a matching relationship between the two models is identified by the following procedure.

(1) Randomly select points by at least the number that is necessary for calculating conversion coefficients. For example, assuming that the number of the points is set at unknown variables plus one, at least 7 points in the case of affine transformation, at least 9 points in the case of projection conversion, and at least 5 points in the case of Helmert transformation (parallel movement and rotation), are randomly selected.
(2) Randomly select a pair of the points, and calculate conversion coefficients for the selected pair.
(3) Sort the conversion coefficients in order of the frequency or the similarity therebetween.
(4) Convert the points in descending order of the sorted conversion coefficients.
(5) Calculate the remainder at each point after the conversion.
(6) Make the point with the least remainder as a candidate.
(7) Check the appropriateness of the candidate based on the adjacent relationship of the reference points.
(8) If the appropriateness is low, try the points that have the conversion coefficients in the next lower sorting order.
(9) Repeat these steps, and select the points having the highest appropriateness in the step (7) as matching points.
(10) Perform the matching so as to match the points precisely.

The matching relationship between the 3D reference point model and the 3D relative model may be identified by a technique for identifying a matching relationship between two images. Regarding this technique, the technique that is described in relation to the processing in step S205 shown in FIG. 4 may be used. Naturally, the matching relationship between the 3D reference point model and the 3D relative model may be calculated by another publicly known method.

6. Other Matters

The mobile vehicle is not limited to an aircraft and may be a vehicle or a vessel. For example, a camera may be mounted on a vehicle, and images can be obtained by photographing from the vehicle that travels. In the above embodiments, processing of utilizing the identification number of the identification plate 32 that is arranged close to the target is not described. However, after the position of the target in the image taken from the mobile vehicle is identified, the image in the vicinity of the target may be enlarged, and the identification number of the identification plate 32 may be read from the enlarged image by image recognition, whereby the coordinate information of the corresponding target 31 may be obtained. In this case, since the search area of the image is greatly narrowed, the image of the identification number of the identification plate 32 is easily detected.

In the technique described in this specification, after the ground surface image and the image taken from the mobile vehicle are matched with each other, the ground surface image can be used as an enlarged image in the vicinity of the target in the image taken from the mobile vehicle. The ground surface image has high definition compared with the image taken from the mobile vehicle, and therefore, the target is more clearly photographed in the ground surface image. In view of this, after the ground surface image and the image taken from the mobile vehicle are matched with each other, the ground surface image may be obtained as an enlarged image of the image taken from the mobile vehicle, and an image of the target may be obtained therefrom.

In the processing in step S404 shown in FIG. 6, identification information (for example, an identification number shown in the identification plate in FIG. 3, or the like) of the target may be obtained instead of the positional information of the target. The identification information is linked with the located position (measured position) of the corresponding target and is made into data. Therefore, obtaining the identification information of the target is equivalent to obtaining the positional information of the target.

Although an example of using dedicated targets as reference points is described, any objects that can be identified as images may be used for indicating reference points. For example, electric poles, road signs, manholes, etc. may be used as the reference points.

What is claimed is:

1. A survey data processing method comprising:
    obtaining multiple first photographed images respectively containing at least one of multiple targets arranged on a ground, the multiple first photographed images being taken from the ground by a camera so that each of the multiple targets are photographed;
    measuring a location of each of the multiple targets by a total station or a global navigation satellite system (GNSS);
    generating a 3D reference point model by referring to the measured locations of the multiple targets;
    obtaining multiple second photographed images respectively containing at least one of the multiple targets, by photographing the ground multiple times from a mobile vehicle that is traveling, so that each of the multiple targets are photographed;
    detecting the image of each of the multiple targets from the multiple second photographed images;
    extracting multiple feature points from the multiple second photographed images;
    calculating a three-dimensional position of each of the extracted multiple feature points by an intersection method;
    calculating a three-dimensional position of each of the multiple targets by referring to the three-dimensional position of each of the feature points corresponding to the multiple targets, to generate a 3D relative model by referring to the three-dimensional position of each of the multiple targets;
    identifying a matching relationship between the 3D reference point model and the 3D relative model;
    identifying a three-dimensional position of each of the multiple targets in the 3D relative model by referring to the matching relationship between the 3D reference point model and the 3D relative model;
    calculating image coordinate values in a stereoscopic image of the multiple targets used for generating the 3D relative model, to obtain a position in the second photographed image of the target, the stereoscopic image being constituted of the multiple second photographed images used for generating the 3D relative model;
    setting a search area in the second photographed image by using the position in the second photographed image of the target;
    aligning the directions of the second photographed image and the image of the search area by using a projection conversion;

obtaining a matching relationship between the first photographed image and the second photographed image by identifying a matching relationship between the second photographed image and the image of the search area of which the directions are aligned with each other; and calculating a location of the target in the second photographed image by referring to the matching relationship between the first photographed image and the second photographed image.

2. The survey data processing method according to claim 1, wherein, in calculation of the three-dimensional position of the extracted multiple feature points by the intersection method, a relationship between a three-dimensional position of the camera at the time the camera photographs each of two of the second photographed images constituting the stereoscopic image and the three-dimensional position of each of the multiple feature points is calculated by a forward intersection method on the basis of multiple common feature points that are extracted from the two second photographed images and on the basis of an attitude of the camera at the time the camera takes each of the two second photographed images.

3. The survey data processing method according to claim 1, wherein, at the stage where the matching relationship between the first photographed image and the second photographed image is obtained, the first photographed image is used as an enlarged image of a part of the second photographed image.

4. The survey data processing method according to claim 1, wherein, in calculation of the location of the target in the second photographed image by referring to the matching relationship between the first photographed image and the second photographed image, the location of the target in the second photographed image is calculated by referring to the position of the target in the first photographed image and the matching relationship between the first photographed image and the second photographed image.

5. The survey data processing method according to claim 4, wherein the target in the second photographed image, of which the location is calculated, is not clearly contained in the second photographed image.

6. A survey data processing device comprising:
   a data receiving unit that receives
      data of multiple first photographed images respectively containing at least one of multiple targets arranged on a ground, the multiple first photographed images being taken from the ground by a camera so that each of the multiple targets are photographed,
      data of a location of each of the multiple targets measured by a total station or a global navigation satellite system (GNSS), and
      data of multiple second photographed images respectively containing at least one of the multiple targets, the multiple second photographed images being obtained by photographing the ground multiple times from a mobile vehicle that is travelling, so that each of the multiple targets are photographed;
   a 3D reference point model generating unit that generates a 3D reference point model by referring to the measured location of each of the multiple targets;
   a target image detecting unit that detects an image of each of the multiple targets from the multiple second photographed images;
   a feature point extracting unit that extracts multiple feature points from the multiple second photographed images;
   a feature point position calculating unit that calculates a three-dimensional position of each of the extracted multiple feature points by an intersection method;
   a 3D relative model generating unit that calculates a three-dimensional position of each of the multiple targets by referring to the three-dimensional position of the feature points corresponding to the multiple targets to generate a 3D relative model by referring to the three-dimensional position of the multiple targets;
   a matching relationship identifying unit that identifies a matching relationship between the 3D reference point model and the 3D relative model;
   a search area setting unit that
      calculates image coordinate values in a stereoscopic image of the multiple targets used for generating the 3D relative model to obtain a position in the second photographed image of the target, the stereoscopic image being constituted of the multiple second photographed images used for generating the 3D relative model, and
      sets a search area in the second photographed image by using the position in the second photographed image of the target;
   an image direction adjusting unit that aligns the directions of the second photographed image and the image of the search area by using a projection conversion;
   an image matching unit that obtains a matching relationship between the first photographed image and the second photographed image by identifying a matching relationship between the second photographed image and the image of the search area of which the directions are aligned with each other; and
   a reference point positional information obtaining unit that identifies a location of the target in the second photographed image by referring to the matching relationship between the first photographed image and the second photographed image.

7. A computer program product comprising a non-transitory computer-readable medium storing computer-executable program codes for processing survey data, the computer-executable program codes comprising program code instructions for:
   obtaining multiple first photographed images respectively containing at least one of multiple targets arranged on a ground, the multiple first photographed images being taken from the ground by a camera so that each of the multiple targets are photographed;
   measuring a location of each of the multiple targets by a total station or a global navigation satellite system (GNSS);
   generating a 3D reference point model by referring to the measured locations of the multiple targets;
   obtaining multiple second photographed images respectively containing at least one of the multiple targets, by photographing the ground multiple times from a mobile vehicle that is traveling, so that each of the multiple targets are photographed;
   detecting the image of each of the multiple targets from the multiple second photographed images;
   extracting multiple feature points from the multiple second photographed images;
   calculating a three-dimensional position of each of the extracted multiple feature points by an intersection method;
   calculating a three-dimensional position of each of the multiple targets by referring to the three-dimensional position of each of the feature points corresponding to the multiple targets, to generate a 3D relative model by referring to the three-dimensional position of each of the multiple targets;

identifying a matching relationship between the 3D reference point model and the 3D relative model;

identifying a three-dimensional position of each of the multiple targets in the 3D relative model by referring to the matching relationship between the 3D reference point model and the 3D relative model;

calculating image coordinate values in a stereoscopic image of the multiple targets used for generating the 3D relative model, to obtain a position in the second photographed image of the target, the stereoscopic image being constituted of the multiple second photographed images used for generating the 3D relative model;

setting a search area in the second photographed image by using the position in the second photographed image of the target;

aligning the directions of the second photographed image and the image of the search area by using a projection conversion;

obtaining a matching relationship between the first photographed image and the second photographed image by identifying a matching relationship between the second photographed image and the image of the search area of which the directions are aligned with each other; and calculating a location of the target in the second photographed image by referring to the matching relationship between the first photographed image and the second photographed image.

\* \* \* \* \*